April 18, 1933.   L. R. O'CONNOR ET AL   1,904,073
TIRE INFLATING DEVICE
Filed Aug. 28, 1931   2 Sheets-Sheet 1
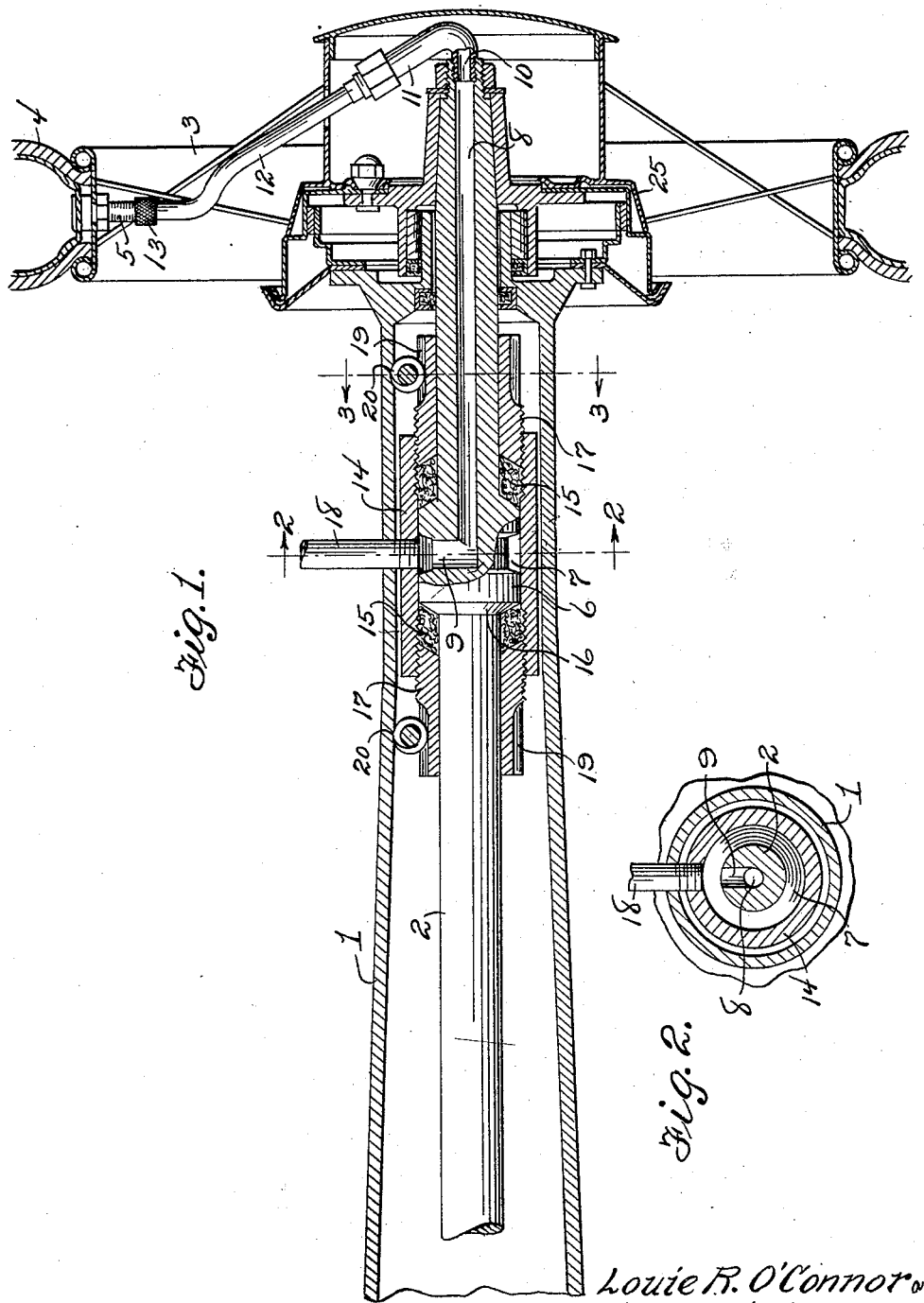
Louie R. O'Connor and
Cullen G. Starnes
INVENTORS
BY Victor J. Evans
and Co. ATTORNEY

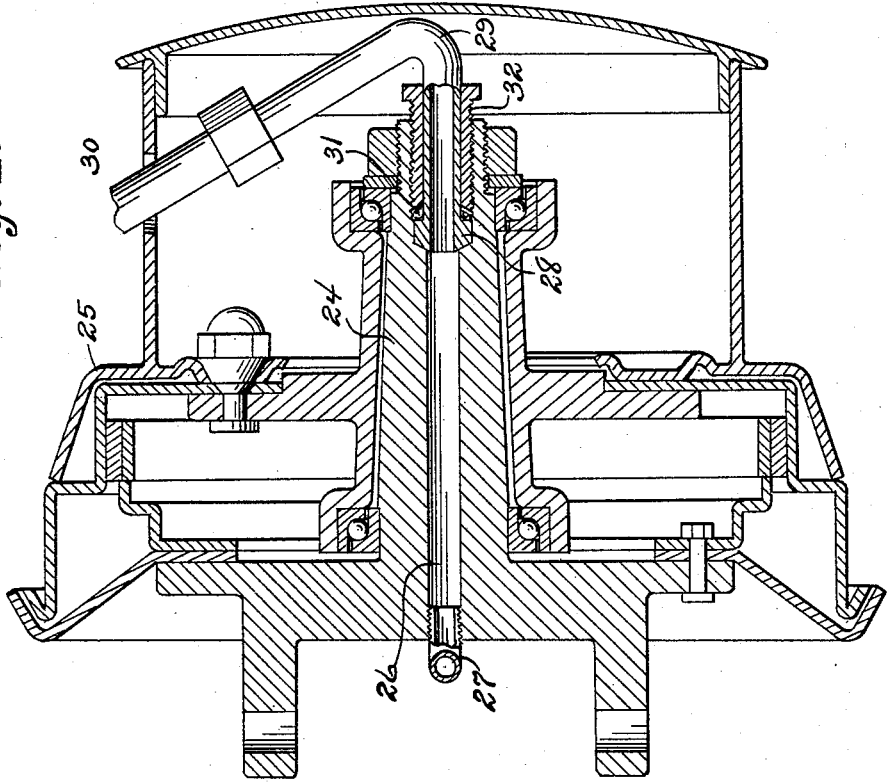
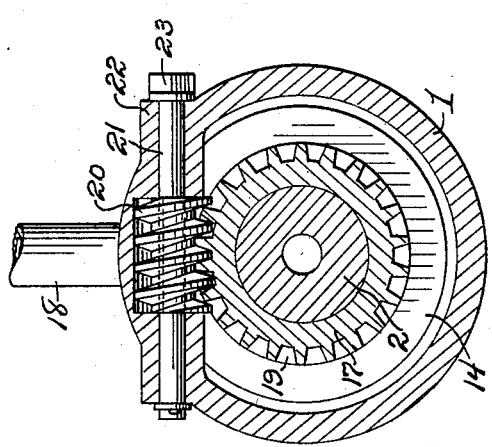
Louie R. O'Connor and
Cullen G. Starnes
INVENTORS
BY Victor J. Evans
and Co. ATTORNEY Patented Apr. 18, 1933

1,904,073

UNITED STATES PATENT OFFICE

LOUIE R. O'CONNOR AND CULLEN G. STARNES, OF MOUNT VERNON, GEORGIA

TIRE INFLATING DEVICE

Application filed August 28, 1931. Serial No. 560,032.

This invention relates to tire inflating devices for motor vehicles and more particularly to means for permitting air pressure to be furnished to each of the tires, either during the rotation of the wheels having the tires thereon or while the wheels are idle or non-rotating to prevent deflation of the tires from punctures or other causes and has for the primary object, the provision of a novel means for conveying the air pressure from a suitable source to the tires by way of the axles of the vehicle without interfering with the operation of the axles or the rotation of the wheels and which will reduce friction between rotating and non-rotating parts to a minimum and without the loss or escape of air pressure.

With this and other objects in view, this invention consists in certain novel features of construction, combination and arrangement of parts to be hereinafter more fully described and claimed.

For a complete understanding of our invention, reference is to be had to the following description and accompanying drawings, in which Figure 1 is a fragmentary sectional view illustrating the rear axle of a motor vehicle and its wheel with our invention associated therewith.

Figure 2 is a sectional view taken on the line 2—2 of Figure 1.

Figure 3 is a similar view taken on the line 3—3 of Figure 1.

Figure 4 is a fragmentary sectional view illustrating the front steering axle of a vehicle with our invention associated therewith.

Referring in detail to the drawings, the numeral 1 indicates the rear axle housing of a vehicle having associated therewith the rear axle 2, to which the wheel 3 is secured. The wheel 3 is journalled on the axle housing 1 in the usual manner and carries the pneumatic tire 4 having the inflating valve 5.

To supply air pressure to the tire 4 at all times a suitable air supply means or source (not shown) is arranged on the vehicle and our invention is employed to connect said means or source with the inflating valve 5 of the tire 4 by way of the axle and the hub of the wheel. The axle 2 within the housing 1 has formed thereon an enlargement 6 provided with an annular groove or channel 7 in communication with one end of a passage 8 formed in the axle and extending outwardly through the outer end of said axle. The passage 8 is formed in the axle in any suitable way and its inner end is provided with a lateral branch 9 communicating with the groove or channel 7 while the outer end of the passage 8 is internally screw threaded to receive a screw threaded end 10 of a nipple or pipe section 11 and to which is detachably secured a pipe 12 extending outwardly of the hub of the wheel and connected to the valve stem 5 by a suitable fitting 13.

A sleeve 14 is mounted on the enlargement 6 of the axle 2 and its internal diameter is of a size to snugly fit the outer diameter of the enlargement 6 and the ends of the sleeve 14 project beyond said enlargement to form therein packing chambers in which packings 15 are positioned. The packings are of graphite or any other suitable kind and are forced against the bevelled faces 16 of the enlargements 6 by glands 17 having threaded connection with the ends of the sleeve 14. The sleeve 14 is provided with an opening therethrough which communicates with the groove or channel 7 and has secured therein a supply pipe 18 which extends through the housing and is adapted to be connected to the air supply means so that the air supply may pass to the tire 4 by way of the passage 8 and pipe 12. The air pressure is prevented from escaping from the groove or channel 7 about the axle and sleeve 14 by packings 15 and to permit adjustment of the glands 17, their outer ends are provided with teeth 19 which mesh with worms 20 secured to shafts 21.

The shafts 21 are journalled in bearings 22 formed integral with the axle housing 1 and one of their ends is shaped to provide wrench engaging faces 23 thus permitting the glands to be adjusted for increasing and decreasing the pressure upon the packings from points exteriorly of the axle housing 1.

As shown in Figure 4, the reference character 24 indicates the steering spindle of a front axle construction and has journalled thereon the hub 25 of a front wheel. The spindle 24 has a passage 26 formed therein and said passage extends entirely through the spindle from one end to its opposite end and one end of the passage is internally screw threaded to receive a nipple 27 adapted for connection to the air supply means while the opposite end of the passage 26 is enlarged to form a seat to be engaged by a head 28 formed integral with a nipple 29. The nipple 29 is detachably secured to a pipe 30 and said pipe is adapted for connection with the inflating valve of the tire of the front wheel. One face of the head 28 is ground to tightly fit the seat formed in one end of the passage 26. A suitable packing 31 engages the head 28 and the spindle 24 by being mounted upon the nipple 29. The packing 31 is forced in engagement with the head and the spindle by a gland 32 mounted on the nipple 29 and having threaded connection with the spindle 24, thus it will be seen that a connection has been established between the spindle 24 and nipple 29 which will permit rotation of the nipple relative to the spindle without the escape of air.

From the foregoing description taken in connection with the accompanying drawings, it will be noted that a very efficient means has been provided for permitting air pressure from a suitable source to be conveyed to the tires of either the front or rear wheels of a vehicle by way of the axles and which will permit the tires to be maintained with a desired air pressure at all times without any of the moving parts being affected by the device.

While we have shown and described the preferred embodiment of our invention, it will be understood that minor changes in construction, combination and arrangement of parts may be made without departing from the spirit and scope of our invention, as claimed.

Having thus described our invention, what we claim is:—

In combination with an axle housing having an axle and a wheel carried by the axle housing and provided with a pneumatic tire, said axle having a passage, means connecting the passage to the tire, an enlargement formed on the axle and having a groove in communication with the passage, a sleeve engaging the enlargement, a pipe carried by said sleeve and extending through the housing for connection with an air supply means to furnish air pressure to the passage by way of the groove, packing glands mounted on the axle and threaded to the sleeve, packing between the enlargement and the glands, and adjusting means for rotating the glands in either direction relative to the sleeve and extending exteriorly of the housing.

In testimony whereof we affix our signatures.

LOUIE R. O'CONNOR.
CULLEN G. STARNES.